United States Patent [19]
Lee

[11] Patent Number: 5,504,498
[45] Date of Patent: Apr. 2, 1996

[54] CONTROL METHOD FOR MOVING A SPECIFIC PORTION OF A GRAPH

[75] Inventor: Chung H. Lee, Suwon, Rep. of Korea

[73] Assignee: Samsung Electronics Co., Ltd., Suwon, Rep. of Korea

[21] Appl. No.: 113,104

[22] Filed: Aug. 30, 1993

[30] Foreign Application Priority Data

Sep. 2, 1992 [KR] Rep. of Korea ...................... 92-15916

[51] Int. Cl.$^6$ ...................................................... G09G 5/34
[52] U.S. Cl. .......................................... 345/125; 345/121
[58] Field of Search ...................................... 345/133, 134, 345/145, 160, 139, 121; 364/474.26, 474.31; 382/45

[56] References Cited

U.S. PATENT DOCUMENTS

| | | | |
|---|---|---|---|
| 4,628,444 | 12/1986 | Nozawa et al. | 364/474.22 |
| 4,723,204 | 2/1988 | Kishi et al. | 364/474.22 |
| 4,751,504 | 6/1988 | Slavin | 345/134 |
| 4,790,028 | 12/1988 | Ramage | 382/45 |
| 4,891,763 | 1/1990 | Kuriyama | 364/474.25 |
| 4,899,096 | 2/1990 | Kawamura et al. | 364/474.31 |
| 4,926,311 | 5/1990 | Matsumura et al. | 364/474.22 |

*Primary Examiner*—Curtis Kuntz
*Assistant Examiner*—Vivian W. Chang
*Attorney, Agent, or Firm*—Burns, Doane, Swecker & Mathis

[57] ABSTRACT

A control method for moving a specific portion of a graph performed so that the moving portion of a graph is designated by a first cursor, and a second cursor is set at the point to get the moving portion of the graph to be moved, a main processor computes the position difference values of these cursor, obtains data such as the starting and terminating points of lines and arcs, moves the specific portion of the graph at the predetermined position and displays the moved graph on CRT screen.

3 Claims, 2 Drawing Sheets

CONTROL METHOD FOR MOVING A SPECIFIC PORTION OF A GRAPH

BACKGROUND OF THE INVENTION

The present invention relates to providing the illustration of a graph diagram depending on the computer numerical control (CNC), and particularly, to providing a control method for moving a specific portion of a graph displaying on a cathode ray tube (hereinafter "CRT").

PRIOR ART

In general numerical control (hereinafter "NC") automatic programming requires knowledge of an NC language, but has often utilized an interrogative programming for facilitating NC instructing data to be gained through the interrogation with a user through interaction with a CRT without knowledge of a NC language. In other words, the NC instructing data is automatically written through a series of procedures of questions and answers about the size of the figures on the CRT screen to obtain a pattern by depressing keys on the manual operating table. The interrogative programing includes displaying functions of moving the screen upward, downward, leftward and rightward, changing the size of the screen, enlarging the necessary portions of a figure, representing all data on the screen to paint a predetermined region or draw cross-hatches and dotted lines. Especially, the drawn figures are changeable.

However, the changing of the drawn figures must accompany the movement of the original point in a three dimensional axis of the figure. It causes all portions of a graph to be moved by a desirable length, but it is not possible to accurately move specific portion of the figure to a predetermined place. Thus, all of the figure must be moved to a fixed region, and not just a specific portion of the figure to a point being sought.

SUMMARY OF THE INVENTION

In order to resolve these disadvantages and problems, it is therefore an object of the present invention to provide a control method for placing a specific portion of a graph at a predetermined point using two cursors.

It is the other object of the present invention to provide a control method for moving a specific portion of a graph to a predetermined point with a first cursor being positioned on the specific portion of the graph to be moved, and a second cursor being at the destination point of the graph to compensate for the distance difference between the positions of the two cursors.

According to the present invention, a control method for moving a specific portion of a graph displayed on a CRT screen comprises the steps of:

defining three dimensional data of an article to be moved, scaling the three dimensional data to correspond to the size of the CRT screen and calculating data to be displayed on the CRT screen; fetching a central value of the article from RAM and scaling data to be represented at the center of the CRT screen through the same procedures as the above step; obtaining the value of differences between the current position of the appointed point of the article and the destination point and calculating the starting and terminating points of lines and arcs on the CRT screen; and interpolating said lines and arcs and displaying the resulting data on the CRT screen.

BRIEF DESCRIPTION OF THE DRAWINGS

The present invention will be described in detail below with reference to the accompanying drawings, in which.

DETAILED DESCRIPTION OF THE INVENTION

Figure 1:
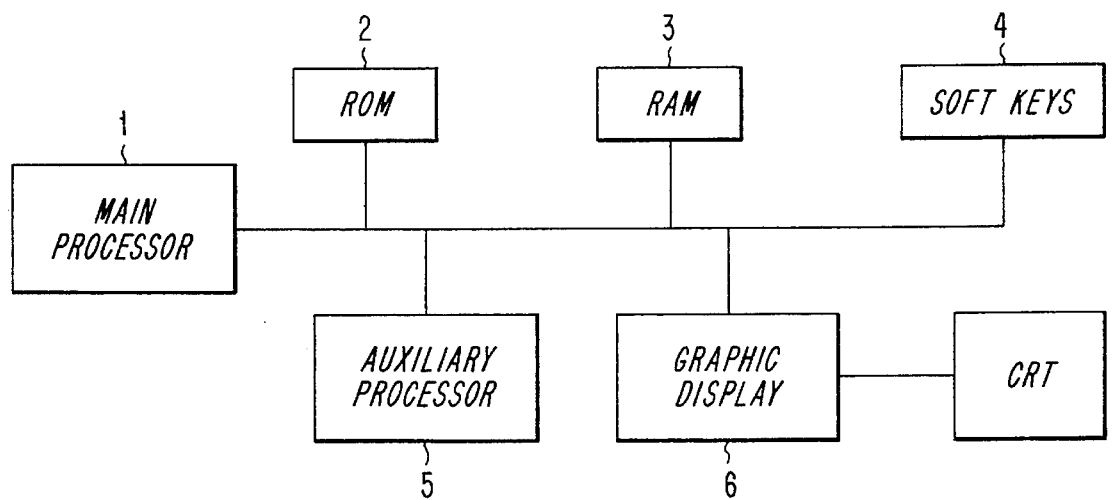
FIG. 1 is a block diagram schematically illustrating a computer numerical control adapted to the present invention.
Figure 2:
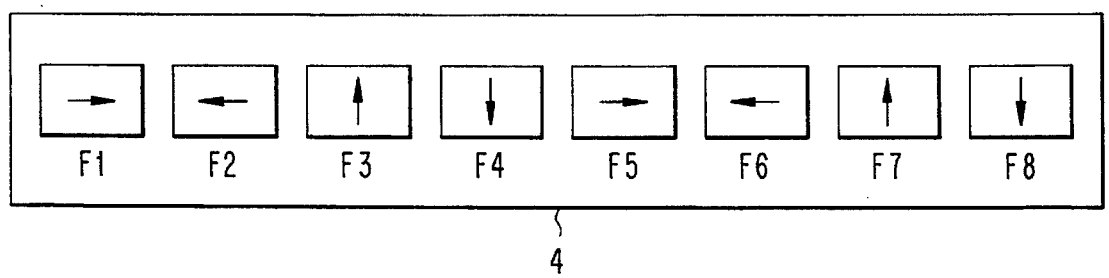
FIG. 2 is a view illustrating a configuration of soft keys used in the present invention; and, FIG. 3 is a flow chart illustrating a method of moving a specific portion of a graph according to the present invention.

Referring to FIG. 1, a main processor 1 fetches programs and parameters stored from a ROM 2 and a RAM 3 and performs the illustration of a graph based on the fetched data. The soft key panel 4 includes eight soft keys F1 to F8 for controlling two cursors on a CRT screen in four directions to move the specific portion of a graph as shown in FIG. 2. An auxiliary processor 5 performs the decimal computation of the destination point to accurately position the graph at the point to which the specific portion is to be moved. A graphic display 6 stores the interpolation results of the graph to be moved according to the programming read from ROM 2 and RAM 3 at a video RAM (not labelled) mounted therein. CRT 7 displays the contents stored at the video RAM of the graphic display. As shown in FIG. 2, the soft key panel 4 is provided with soft keys F1, F2, F3 and F4 for moving first cursor in four right, left, up and down directions in order to designate the specific portion of the graph to be moved and soft keys F5, F6, F7 and F8 for appointing the destination points in four right, left, up and down directions to designate the position to which the specific portion of the graph is to be moved.

Herein, ROM 2 stores a program for controlling the operation of the total system, and RAM 3 stores various data, such as a screen center value, an article center value etc, for moving the specific portion of the graph.

Figure 3:
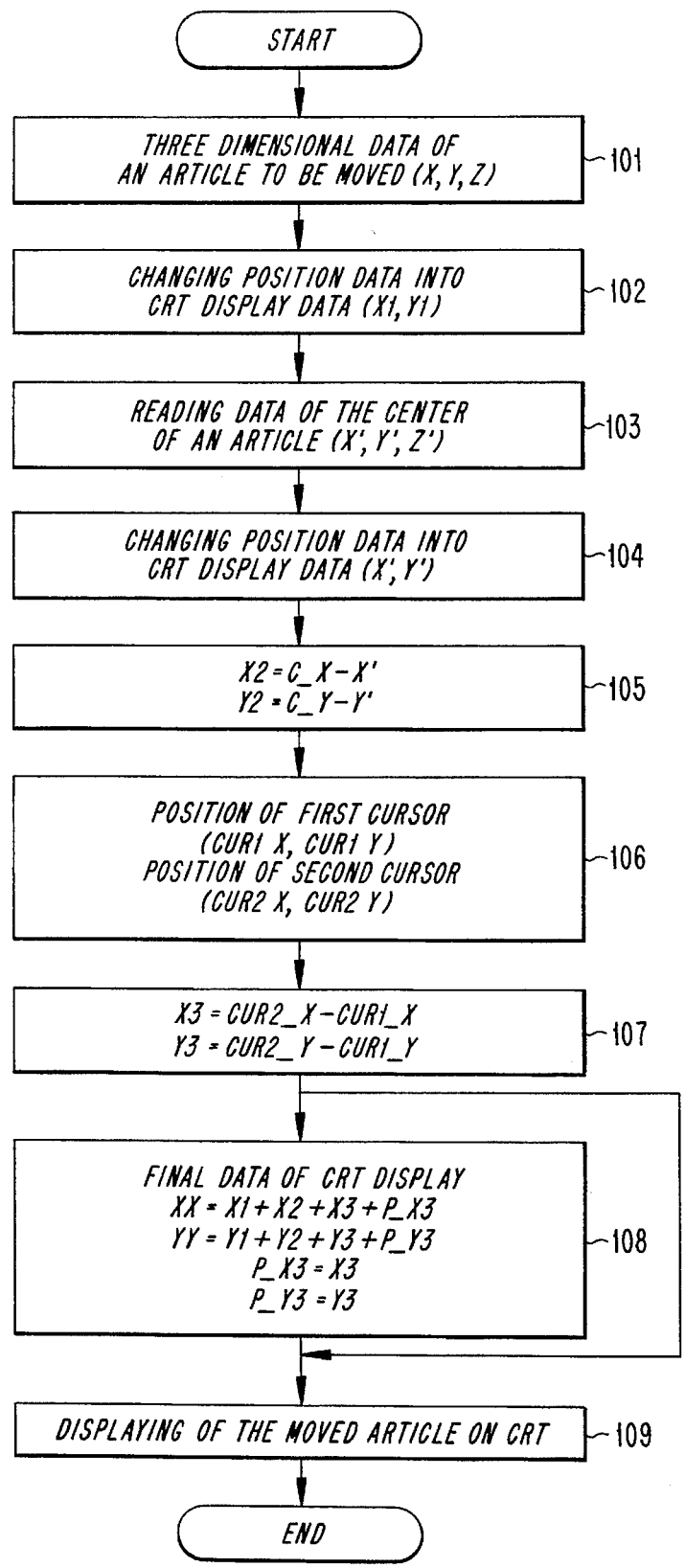

The operation of the present invention will be explained in detail referring to FIG. 1 to FIG. 3.

First, step 101 is performed so that a main processor 1 stores at RAM 3 three dimensional data information (parameters constituted as G-codes) and center values (x', y', z') of an article to be illustrated on CRT 7, and calculates three dimensional data information (x, y, z) of an article to be moved using the three dimensional data information stored at RAM 3 according to the read results of system programs stored at ROM 2.

Step 101 is moved onto step 102 to scale the dimensional data (x, y, z) of the article to be moved to correspond to the size of a CRT screen as well as to calculate data (X1, Y1) to display on the CRT, in which the wording "scaling" means that a physical value is a work representing a function of variables considered as two variable ratios.

Step 103 is performed so that the main processor 1 reads the center values (x', y', z') of the article from RAM 3 so as to display the article at the center of the CRT screen.

Step 104 is set up like the operation of step 102 so that the center values (x', y', z') of the article are scaled to be equal to the CRT screen size and changed into data (X', Y') to be displayed.

Step 105 is to compute the values (X2, Y2) based on the following formula (1), in which the center value of the article is deviated from the center ($C\_X$, $C\_Y$) of the CRT screen, in order to display all graphs at the center of CRT screen except for the case where a graph has been already moved.

$$X2 = C\_X - X'$$
$$Y2 = C\_Y - Y' \quad (1)$$

Step 106 is to enable the main processor 1 to recognize the operations by the users of the first cursors F1, F2, F3 and F4 for designating a specific portion of a graph to be moved and the second cursors F5, F6, F7 and F8 for designating a destination point to which the specific portion of a graph is to be moved. Herein, the specific point of the article of the graph are Cur1_X and Cur1_Y, and the destination are Cur2_X and Cur2_Y. It means that the specific and destination points of the graph were determined as calculated in step 106.

Step 107 is to calculate the position difference values of two cursors using the following formula (2)

$$X3 = Cur2\_X - Cur1\_X$$
$$Y3 = Cur2\_Y - Cur1\_Y \quad (2)$$

Step 108 is set up to compute data to finally be displayed on the screen of CRT 7 by the main processor 1, for example the starting and terminating points (XX, YY) of lines and arcs on the CRT screen, as the following formula (3).

$$XX = X1 + X2 + X3 + P\_X3$$
$$YY = Y1 + Y2 + Y3 + P\_Y3 \quad (3)$$

Wherein, P_X3 and P_Y3 represents the difference values (X3, Y3) between two cursors after moving from the time of the previous position of two cursors, and these values are requested when the graph is again moved along with the movement of two cursors (the initial values each is zero).

As the starting and terminating points (XX, YY) of the lines and arcs on the CRT screen are calculated at step 108, step 109 is set to enable the main processor 1 to interpolate the lines and arcs according to the system programming stored at ROM 2, store the results at the video RAM mounted in the graphic display 6 and then display these stored data on CRT 7.

As described above, the present invention comprises a control method for exactly moving a specific portion of a graph in a manner that the specific point of a graph to be moved is designated by a first cursor, and a second cursor is set at the point to which the specific point of the graph is to be moved, a main processor computes the position difference values of these cursors, thereby obtaining data, for example, the starting and terminating points of lines and arcs, to be displayed on the CRT.

What is claimed is:

1. A control method for moving a specific portion of a graph in which an article is displayed on a display unit comprising the steps of:

defining three dimensional data of the article to be moved, scaling the three dimensional data to correspond to the size of the display unit and obtaining data to be displayed on the display unit;

reading center values of the article from a memory and scaling data to be represented at the center of the display unit to correspond to the size of the display unit;

computing the values of differences between a current position of the specific portion of the graph to be moved and a destination point and calculating the starting and terminating points of control parameters on the display unit, wherein the current position of the center of the graph is calculated according to the following formula to be at the center of the display unit:

$$X2 = C\_X - X';$$
$$Y2 = C\_Y - Y';$$

where $C\_X$ and $C\_Y$ define a center point on the display unit, X' and Y' is a two-dimensional value determined from a three-dimensional center point of the article and X2 and Y2 are difference values between the central point of the display unit and the current center point of the article;

the differences between the specific portion of the article to be moved and the destination points of the graph are calculated according to the following formulas:

$$X3 = Cur2\_X - Cur1\_X;$$
$$Y3 = Cur2\_Y - Cur1\_Y;$$

where Cur1_X and Cur1_Y represent the specific portion of the graph to be moved and Cur2_X and Cur2_Y represent the destination point; and, interpolating said control parameters and displaying resulting data on the display unit.

2. The control method according to claim 1, wherein said specific portion of the graph to be moved and said destination point are designated by soft keys provided with two cursors for the upward, downward, leftward and rightward movements thereof.

3. The control method according to claim 1, wherein the starting and terminating points of the control parameters on the display unit are calculated according to the following formulas:

$$XX = X1 + X2 + X3 + P\_X3;$$
$$YY = Y1 + Y2 + Y3 + P\_Y3;$$

where X1 and Y1 are said data to be displayed on the display unit and P_X3, P_Y3 represent difference values, represented by (X3 and Y3), between the two cursors over time.

* * * * *